Figure 1:
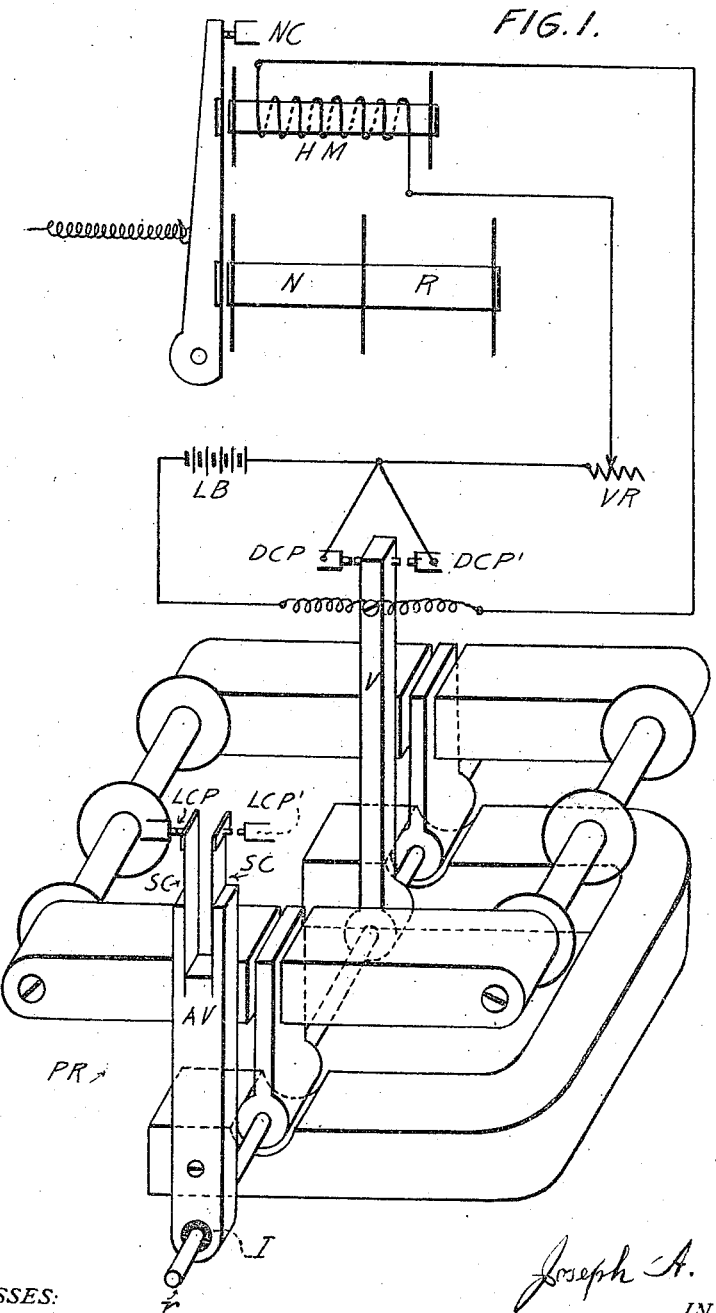

UNITED STATES PATENT OFFICE.

JOSEPH A. ELMS, OF SOMERVILLE, MASSACHUSETTS.

ELECTRIC-TELEGRAPH APPARATUS.

1,158,665.   Specification of Letters Patent.   Patented Nov. 2, 1915.

Application filed October 30, 1912. Serial No. 728,694.

*To all whom it may concern:*

Be it known that I, JOSEPH A. ELMS, a citizen of the United States, residing at Somerville, in the county of Middlesex and State of Massachusetts, have invented a new and useful Electric-Telegraph Apparatus, of which the following is a specification.

My invention relates to improvements in electric telegraph apparatus, in which a local battery is substituted for condensers or other inductive electrical devices at present or heretofore used for the purpose of energizing an electro-magnet whose function it is to hold the armature of another electro-magnet in a closed position with reference to its contact points, during the momentary absence of the main current in the latter magnet, such as happens when the pole-changing transmitting instrument at the other end of a telegraph line reverses the polarity of the battery in a multiplex telegraph system, or from other causes.

In a quadruplex telegraph system, there are at each end of a telegraph wire, a polarized relay responding to electric impulses of alternate polarity under the control of a pole-changer at the opposite end of the same wire, and a neutral relay responding only to electric impulses under the control of a transmitter, also at the opposite end of the same wire whose function it is to vary the strength of whichever current polarity is at the time being presented to the line by the pole-changer at the transmitting end of the wire. In the operation of reversing the polarity of the transmitted current, this pole-changer opens the telegraph line momentarily at each reversal, and causes an interval of no magnetism in the magnets of the neutral relay of the quadruplex set at the other end of the wire. If this momentary opening of the line occur at the time that a signal is being sent to the line requiring the full strength of the battery in order to close the neutral relay at the distant end of the line, this neutral relay will lose its magnetism for an instant, and its armature will open its local contact point by force of a retractile spring attached to it, and the signal will be mutilated. To prevent this mutilation, and bridge over this interval of no magnetism in the neutral relay, various devices have been adopted heretofore, depending upon the sluggish action of an extra local circuit operated by the back stop of the armature of the neutral relay, and by means of condenser discharges through so-called holding coils intended to keep the armature of the neutral relay closed against its local contact points until the return of the main battery current. None of these devices fill the gap perfectly, and the objects of my improvements are to provide a steady current of electricity which shall fill up the entire gap of no current in the main coils of the neutral relay, by entering the coils of the holding magnet located above the main coils, at the instant that the current disappears from these main coils, remaining therein during the entire interval of no magnetism in the neutral relay magnets, and automatically cut off from the holding coils the moment the current reappears in the main coils when the distant pole-changer again closes the line.

Figure 2:
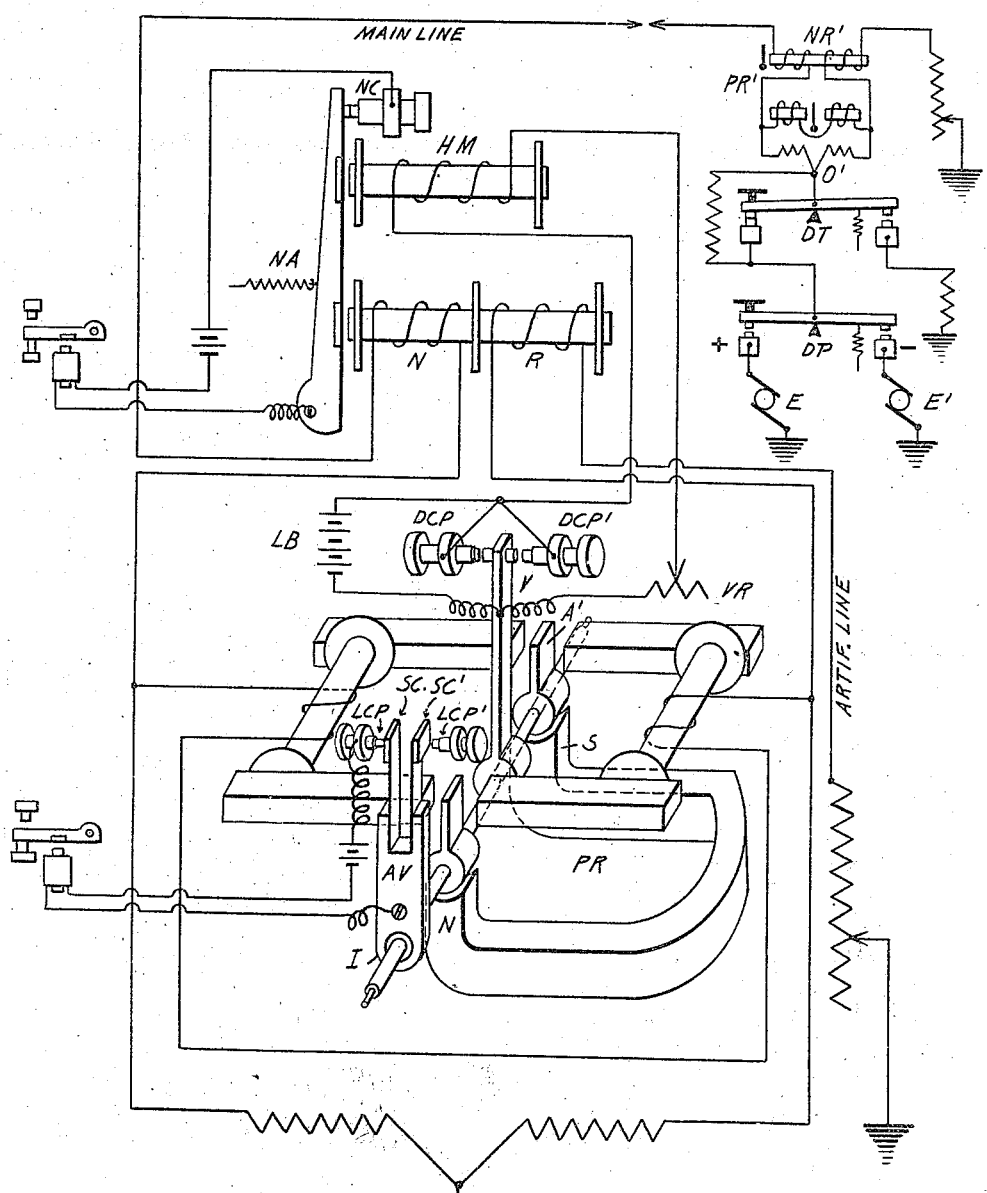

I attain these objects by the mechanism illustrated in the accompanying drawings, in which a polarized relay, P R, Figure 1, first sheet, is represented with its several parts assembled theoretically, and a neutral relay, N R, with a holding magnet, H M directly above it, is also drawn theoretically. The wires connecting the coils of holding magnet H M with the working parts of polarized relay P R, are represented theoretically by heavy lines. The whole of my invention is illustrated on the first sheet. Fig. 2, second sheet, represents theoretically the receiving apparatus and wiring of a quadruplex telegraph set of the bridge-differential type, with my improvements forming a part thereof. The wiring belonging to my invention is in heavy lines. Other wiring is in light lines. The relays on both sheets are the same.

Similar letters refer to similar parts throughout the two views.

Polarized relay P R, has its armatures and other moving parts mounted upon a non-magnetic arbor $r$. One of these moving parts is metallic lever V, whose free end oscillates between two contact points D C P, and D C P', making electrical contact with either one. D C P and D C P' are electrically connected with each other.

H M, is an electro-magnet located just above the magnets of neutral relay N R, and acting magnetically upon the same armature lever as that of N R, forming a holding magnet.

L B, is a local battery, the current from which follows a wire making connection with the two contact points D C P and D C P', thence through a variable resistance V R, to the coils of holding magnet H M. Passing through these coils the L B current returns through a wire connected with metallic lever V, and to the return pole of L B, completing the circuit. The result of this method of wiring is that whenever lever V is in contact with either D C P or D C P', the current from local battery L B short-circuits through this route and does not enter holding magnet coils H M. Whenever lever V, following the movements of the polarized relay armatures, crosses from one contact point to the other, as it does with each reversal of the distant pole-changer, and breaks contact with D C P or D C P', it destroys the short circuit, and the current from L B flows into the coils of holding magnet H M until again cut off therefrom by the restoration of the short-circuit before described.

In order to hasten the breaking of contact between lever V and contact point D C P or D C P', and make the entry of current into the coils of holding magnet H M coincide with the disappearance of current from the coils of neutral relay N R, an auxiliary metallic lever A V ending in two spring contacts S C and S C', oscillates between two fixed contact points L C P and L C P', in unison with the movement of lever V between contact points D C P and D C P'. Contact points L C P and L C P' should be adjusted a little nearer to spring contacts S C and S C' than contact points D C P and D C P' are to the contacts on metallic lever V. A current on the line which will cause lever V to make contact with contact point D C P, will also cause auxiliary lever A V to make contact with contact point L C P, and its spring contact will be forced back a little. The instance the distant pole-changer opens the circuit, and the current leaves that side of the relay, this spring contact will return to its normal position, carrying with it auxiliary lever A V and lever V, which will at the same time break contact with contact point D C P, and allow current from local battery L B to flow into holding magnet H M, and remain therein during the interval of time occupied by the distant pole-changer in crossing to its opposite pole, and the reversed main line current will then carry levers V and A V the rest of the way to their opposite stops cutting off the current from local battery L B from holding magnet H M the moment it is no longer needed.

The position of the several contact points at the beginning of the interval of no magnetism in the relays is illustrated in Fig. 1, Sheet 1.

Spring contact S C is still in connection with contact point L C P, the reversed main line current which would carry the levers to the opposite points not having yet arrived, but the elasticity of spring S C has caused lever V to break contact with contact D C P, and current from L B is flowing through the coils of holding magnet H M, and this magnet is holding the armature of neutral relay N R closed against its own local contact point N C which operates a local sounder on the neutral side of the quadruplex set, thus preventing the mutilation of any signal depending upon the proper working of neutral relay N R.

V R is a variable resistance added to that of the coils of holding magnet H M, for the purpose of making the strength of local battery L B proportional to the strength of the full main line current in its power to attract the armature lever of neutral relay N R. This local battery current should not be strong enough to draw the armature of neutral relay N R away from its back stop when that relay is open, and that armature is being held back by its retractile spring, but strong enough to hold this armature closed when it finds it closed and during the brief interval of no magnetism in the magnets of neutral relay N R. Being automatically cut off from holding magnet H M whenever any current is present in the main line coils, this local current can never interfere with such main line current.

Metallic lever V constitutes an electric valve, contact points D C P and D C P' forming the seat of said valve, and metallic lever A V with its spring contacts S C and S C' constitutes an auxiliary to said electric valve, all in the manner substantially as described for the purpose of controlling the admission or exclusion of an electric current to or from the coils of a holding magnet, substantially as described.

All the features of lever V and auxiliary lever A V may be combined on to one lever with suitable insulation between them where needed. For clearness of description, I have divided them between two levers, and I prefer two levers instead of one for the purpose described.

To avoid unnecessary multiplicity of parts, and to enable auxiliary lever A V with its spring contacts and contact points to perform such secondary duty as it may without interference with its main function, an insulating substance I, separates it electrically from all other parts mounted on the same arbor r.

Lever A V and contact point L C P in Fig. 2, second sheet, are shown as operating a local sounder on the polar side of a quadruplex set, as a secondary duty.

When two quadruplex sets are used as repeaters of the direct point repeating type, levers A V of each set may act as pole-changers in the same way that armatures of polarized relays are used for such purpose, proper battery connections being made with contact points L C P and L C P'. Neither of these secondary duties will interfere with the primary functions of the parts indicated.

I am aware of the fact that independent holding magnets or a third coil wound around the magnets of the neutral relay N R are and have been used for the purpose of holding the armature of this relay in a closed position during the interval of no magnetism described; but this holding magnet is now and has been energized by condenser discharges or other inductive influences, the effect of which is but momentary, not lasting long enough to guard the signals made by this relay from mutilation.

What I claim as my invention, and desire to secure by Letters Patent, is contained in the following claims:

1. In a multiplex telegraph system, a polarized relay; a neutral relay having a holding magnet coil; a local battery to energize same; means for energizing said relays as commonly used in multiplex telegraph systems, and means operated by the polarized relay whereby the holding relay coil becomes energized when the polarized relay becomes deënergized.

2. In a multiplex telegraph system, a neutral relay having a holding magnet coil; a local source of energy for said coil; a polarized relay; a source of current and circuit for said relays as commonly used in multiplex telegraph systems; a poralized relay armature, and means operated by said armature whereby said coil is energized whenever said armature moves from either of its contacts, regardless of the strength of current in said circuit.

3. In a multiplex telegraph system, a neutral relay having a holding magnet coil; a local source of current to energize said coil; a polarized relay; a strong and a weak source of current to operate said relays as commonly used in multiplex telegraph systems; a polarized relay armature; means operated by said armature whereby said coil becomes operative whenever said armature moves from either of its coöperating contact points in either direction.

4. In a multiplex telegraph system, a polarized relay; a circuit for same; a source of current to energize same; means whereby the direction of flow of said current may be changed as commonly used in multiplex telegraph systems; an armature for said relay carrying a contact member designed to close an electric circuit, said armature having a normal position of rest and a temporary position of rest; a contact point to coöperate with said contact member at either position of rest; springs to accelerate the movement of said armature away from each contact point to a point where the contact member breaks contact with its coöperating point; a neutral relay having a holding magnet coil; a local source of current and circuit for controlling said coil; said contact member and point being associated with said circuit as and for the purpose set forth, and means whereby said coil is not energized when current is flowing in said polarized relay circuit in either direction, and is energized when no current is flowing in said circuit.

5. In a multiplex telegraph system, a polarized relay; a source of current for same; an armature therefor carrying a contact member designed to operate an electric circuit; said armature having a normal and a temporary position of rest; a contact point to coöperate with said contact member at either position of rest; springs to accelerate the movement of said armature away from either contact point whenever not held thereto by any magnetic influence; a neutral relay having a holding magnet coil; a shunt in multiple with said coil: a local source of current to energize said coil; electric circuits controlled through said contact member and coöperating points, whereby current from said local source may be caused to flow through said holding magnet coil when no current is flowing through said relay magnets.

6. In a multiplex telegraph system, a polarized relay; a neutral relay having a holding magnet coil; a local battery and circuit for energizing said coil; a shunt normally in multiple with said coil; a polarized relay armature; a contact member thereon; contact points to coöperate with said contact member; said contact member and points serving to close said shunt when said armature is at rest, and to open said shunt during any movement of said armature and permit current to flow through the holding magnet coil as, and for the purpose set forth.

7. In a multiplex telegraph system, a polarized relay; an armature for the same; a neutral relay having a holding magnet coil; a source of current having a variable strength; a pole-changing transmitter operated at the distant station for reversing the direction of said source of current; a front and back contact stop against which said polarized relay armature may rest, depending upon the direction of flow of said current; a source of current to energize said holding magnet coil, and means whereby said coil is energized during movement of said polarized relay armature from one contact point to the other regardless of the strength of said variable current.

8. In a multiplex telegraph system, a polarized relay and a neutral relay, the former operated by currents the direction of flow of which may be reversed by a pole-changing transmitter operated at the distant station, the latter operated by currents of variable strength controlled by a transmitter operated at the distant station; a holding magnet coil associated with said neutral relay, and designed to act on the armature thereof; an armature for said polarized relay carrying a contact member; a front and back contact stop between which said contact member may oscillate or against either of which it may rest according to the direction of flow of current regardless of strength in said polarized relay; a local source of electricity to energize said holding magnet coil, and said contact member and coöperating front and back contact stops so connected with said local source of electricity and said holding magnet coil as to constitute means whereby said holding magnet coil is deënergized whenever current of any strength is flowing through said polarized relay and the contact member is in engagement with either of its contact stops and is energized whenever no current is flowing through said polarized relay or during transit of said contact member from one contact point to the other in either direction; a second contact member also carried upon said polarized relay armature, but insulated therefrom, and terminating in spring contacts designed to coöperate with its front and back contact stops in the operation of any electric circuit, and at the same time constitute means whereby said first contact member shall break contact with either of its coöperating contact stops whenever not held thereto by any magnetic influence substantially as described and for the purposes set forth in the accompanying specifications.

9. In a multiplex telegraph system a polarized relay, an armature having a normal and a temporary position of rest; a contact member thereon; an electric circuit; contact points to coöperate with said member at either position of rest to control said electric circuit; other electric circuits; contact springs on said armature to control said other electric circuits; said contact springs being so adjusted as to accelerate the movement of said armature away from either position of rest, and cause the contact member to quickly break contact with its then coöperating contact point, as, and for the purpose set forth.

In testimony whereof, I have signed my name to this specification in the presence of two subscribing witnesses.

JOSEPH A. ELMS.

Witnesses:
 RAYMOND H. ELMS,
 EVA V. ELMS.

Copies of this patent may be obtained for five cents each, by addressing the "Commissioner of Patents, Washington, D. C."